(12) United States Patent
Casati (10) Patent No.: US 10,999,788 B2
(45) Date of Patent: May 4, 2021

(54) MANAGING VPLMN CONFIGURATION UPDATES IN THE UE DUE TO HOME PLMN CONFIGURATION CHANGES

(71) Applicant: Nokia Technologies Oy, Espoo (FI)

(72) Inventor: Alessio Casati, Surrey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/417,708

(22) Filed: May 21, 2019

(65) Prior Publication Data

US 2019/0357128 A1 Nov. 21, 2019

Related U.S. Application Data

(60) Provisional application No. 62/674,465, filed on May 21, 2018.

(51) Int. Cl.

| | |
|---|---|
| *H04W 48/18* | (2009.01) |
| *H04W 76/11* | (2018.01) |
| *G06F 9/455* | (2018.01) |
| *H04W 48/16* | (2009.01) |
| *H04W 60/00* | (2009.01) |
| *H04W 84/04* | (2009.01) |

(52) U.S. Cl.
CPC ........ *H04W 48/18* (2013.01); *G06F 9/45558* (2013.01); *H04W 48/16* (2013.01); *H04W 60/00* (2013.01); *H04W 76/11* (2018.02); *G06F 2009/45595* (2013.01); *H04W 84/042* (2013.01)

(58) Field of Classification Search
None
See application file for complete search history.

(56) References Cited

U.S. PATENT DOCUMENTS

| | | |
|---|---|---|
| 8,805,355 B2 | 8/2014 | Zhao |
| 9,668,203 B2 | 5/2017 | Zhang et al. |
| 2017/0332226 A1 | 11/2017 | Bharatia |

(Continued)

FOREIGN PATENT DOCUMENTS

WO WO 2017/081864 A1 5/2017

OTHER PUBLICATIONS

3GPP TS 23.501 VO.3.1, $3^{rd}$ Generation Partnership Project; Technical Specification Group Services and System Aspects; Systems Architecture for the 5G System; Stage 2 (Release 15) (2017) 101 pages.

(Continued)

*Primary Examiner* — Brian S Roberts
(74) *Attorney, Agent, or Firm* — Alston & Bird LLP (57) ABSTRACT

Methods and apparatus, including computer program products, are provided for managing configuration updates. In some example embodiment, there may be provided an apparatus including at least one processor and at least one memory including computer program code, the at least one memory and the computer program code configured to, with the at least one processor, cause the apparatus to at least: receive an indication regarding whether a home network makes a change to a previous configuration information for the apparatus; and delete, when the received indication represents the change, the previous configuration information stored at the apparatus. Related systems, methods, and articles of manufacture are also described.

38 Claims, 5 Drawing Sheets

(56) References Cited

U.S. PATENT DOCUMENTS

| | | | |
|---|---|---|---|
| 2017/0332421 A1* | 11/2017 | Sternberg | H04W 12/0609 |
| 2018/0368061 A1* | 12/2018 | Yu | H04W 8/12 |
| 2019/0053147 A1* | 2/2019 | Qiao | H04M 15/66 |
| 2019/0261185 A1* | 8/2019 | Velev | H04W 48/18 |
| 2019/0268835 A1* | 8/2019 | Shan | H04W 48/08 |

OTHER PUBLICATIONS

3GPP TS 23.502 $3^{rd}$ V0. 2.0 Generation Partnership Project; Technical Specification Group Services and System Aspects; Procedures for the 5G System; Stage 2 (Release 15) (2017) 80 pages.

3GPP TS 29.272 V8.11.0, $3^{rd}$ Generation Partnership Project; Technical Specification Group Core Network and Terminals; Evolved Packet System (EPS); Mobility Management Entity (MEE) and Serving GPRS Support Node (SGSN) Related Interfaces Based on Diameter Protocol (Release 8) (Jun. 2011) 76 pages.

3GPP TS 23.122 V8.2.0, $3^{rd}$ Generation Partnership Project; Technical Specification Group Core Network and Terminals; Non-Access-Stratum (NAS) Functional Related to Mobile Station (MS) In Idle Mode (Release 8) (Jun. 2018) 35 pages.

ETSI TS 122 032 V11.0.0, Digital Cellular Telecommunicaiton System (Phase 2+); Universal Mobile Telecommunications Systems (UMTS); LTE; Immediate Service Termination (IST); Service Description; Stage 1 (Release 11) (Oct. 2012) 9 pages.

SA WG2 Meeting #122, Slice Co-Existence, Ericsson S2-175271 (Jun. 2017) 9 pages.

Office Action for Taiwanese Patent Application No. 108117372 dated Mar. 4, 2020, 16 pages.

*Network Slicing Clause Cleanup*, 3GPP TSG-SA2 Meeting #127, S2-183403 (Apr. 2018) 7 pages.

International Search Report and Written Opinion for Application No. PCT/IB2019/054205 dated Aug. 6, 2019, 17 pages.

3GPP TS 23.501 V15.1.0, $3^{rd}$ Generation Partnership Project; Technical Specification Group Services and System Aspects; Systems Architecture for the 5G System; Stage 2 (Release 15) (Mar. 2018) 201 pages.

3GPP TS 23.502 V15.1.0, $3^{rd}$ Generation Partnership Project; Technical Specification Group Services and System Aspects; Procedures for the 5G System; Stage 2 (Release 15) (Mar. 2018) 285 pages.

Network Slicing Subscription Change and Update of UE Configuration, 3GPP TSG-SA2 Meeting #127, S2-186215 (May 28-Jun. 1, 2018) 4 pages.

SA WG2 Meeting #128, Clarification on Configured NSSAIs Valid for any PLMN, S2-187901 (Aug. 20-24, 2018) 7 pages.

SA WG2 Meeting #128,Completion of Description on Configured NSSAIs, S2-188981 (Aug. 20-24, 2018) 7 pages.

SA WG2 Meeting #128,Network Slicing Subscription Change Indication, S2-187300 (Jul. 2-6, 2018) 16 pages.

Office Action for Bangladesh Application No. 120/2019/ dated Aug. 27, 2020.

Notice of Acceptance for Bangladesh Patent Application No. 120/2019/3345 dated Nov. 25, 2020, 1 page.

* cited by examiner

Receive, at a user equipment, configuration information and/or indication regarding whether the received configuration information represents a change associated with the HPLMN 210

↓

◇ Indication represents HPLMN change received? 208

YES →
Delete configuration information, such as network slicing configuration information, stored locally at the UE, when the indication represents the HPLMN 210

↓

Receive, at UE, configuration information including network slicing configuration information as part of registration to a PLMN to enable the UE to obtain updated network slicing configuration data 220

NO →
If configuration information received for the current serving PLMN, Update, at UE, configuration information, such as network slicing configuration information, stored locally at the UE without affecting the stored configuration of other PMNS., when no indication that change is associated to the HPLMN is received 230

FIG. 5 ate changes to the UE's subscription at the HPLMN may

MANAGING VPLMN CONFIGURATION UPDATES IN THE UE DUE TO HOME PLMN CONFIGURATION CHANGES

CROSS-REFERENCE TO RELATED APPLICATIONS

This application claims the benefit of and priority to U.S. Provisional Application No. 62/674,465, entitled "Managing VPLMN Configuration Updates in the UE Due to Home PLMN Configuration Changes," filed May 21, 2018, the entire contents of which are hereby incorporated herein by reference for all purposes.

FIELD

The subject matter described herein relates to wireless.

BACKGROUND

As the cellular system including the Fifth Generation (5G) system supports an increasing number of devices and services including applications with a wide range of use cases and diverse needs with respect to bandwidth, latency, and reliability requirements, the cellular system may need to prioritize resources across the wireless access network and the core network (and/or for example, prioritizing across the control plane and the user plane) to support differentiation among different services.

SUMMARY

Methods and apparatus, including computer program products, are provided for managing configuration updates.

In some example embodiment, there may be provided an apparatus including at least one processor and at least one memory including computer program code, the at least one memory and the computer program code configured to, with the at least one processor, cause the apparatus to at least: receive an indication regarding whether a home network makes a change to a previous configuration information for the apparatus; and delete, when the received indication represents the change, the previous configuration information stored at the apparatus.

In some variations, one or more of the features disclosed herein including the following features can optionally be included in any feasible combination. The apparatus may be further caused to at least: receive configuration information including the indication. The deletion of the previous configuration information includes deletion of the previous configuration information associated with the home network and a visiting network. The deletion of the previous configuration information may include at least one network slice identifier. The deletion may enable the apparatus to obtain updated configuration information for at least the visiting network currently serving the apparatus and/or the home network. The apparatus may be further caused to at least: receive the updated configuration information for at least one other visiting network to replace the deleted, previous configuration information, when the indication represents the change associated with the home network is received. The apparatus may be further configured to at least: wait to perform, after obtaining the received configuration information, a registration to obtain the updated configuration information until an updated user equipment route and access selection policy is received. The apparatus may be further caused to at least: update configuration information for the visiting network, when the indication is received representing the change associated with the home network; and update configuration information for the visiting network only, when no indication is received that represents the change associated with the home network. The indication may represent the home network indicating to the visiting network currently serving the user equipment that the change in the home network is to be taken into account in the visiting network for configuring the apparatus.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

BRIEF DESCRIPTION OF THE DRAWINGS

In the drawings.

Like labels are used to refer to same or similar items in the drawings.

DETAILED DESCRIPTION

In the 5G system, a user equipment (UE) may be roaming from a home public land mobile network (HPLMN) to a visiting public land mobile network (VPLMN). When this is the case, the UE may have configuration information for use in the VPLMN to, for example, enable access to one or more services that are available at the VPLMN. The configuration information for a UE may change due to local decisions at a VPLMN, for example. Alternatively or additionally, the UE's configuration information may change due to, for example, changes in the UE's subscription information at the HPLMN.

To illustrate further, the UE may access a service at an HPLMN and/or a VPLMN based on the UE's configuration information, which may be based on subscription information that indicates the allowed and/or the available services. The UE's subscription information may change due to, for example, the HPLMN making or initiating changes to the UE's subscription, in which case the VPLMN-related configuration information for the one or more services may also need to be updated as well to make it consistent with the change(s) at the HPLMN. Thus, a change in the subscription information (which may be stored in a Unified Data Management (UDM) node in the HPLMN) may trigger changes to the UE's configuration information for operating in an HPLMN and/or a VPLMN.

The VPLMN and HPLMN configuration information may have values that are different, and a mapping may be established by the VPLMN, without the HPLMN being aware of the values used locally within the VPLMN. For example, if the HPLMN changes a UE's subscription, the VPLMNs may need to independently update the configuration information including subscription related information, so the UE has up to date VPLMN information. To illustrate further, the subscription information at the HPLMN may change QoS or another aspect of a network slice, or it may change entirely the fact a certain slice could be accessible, or the subscription may include new slices the UE can use. This change may trigger a corresponding change in the configuration information for use of the VPLMN.

When the HPLMN configuration changes with respect to the UE's subscription changes for example, the VPLMN configuration with respect to the UE's subscription may need an update. While the UE is registered in a VPLMN, the HPLMN may push to the VPLMN the configuration information to update (which as noted stored at a network node, such as a Unified Data Manager (UDM, which may serve as a repository for storing this and other configuration and/or subscription information). However, when the UE is visiting another VPLMN, the new VPLMN may receive the up to date configuration or subscription information for a UE but the VPLMN may not be able to detect whether the information represents a change, as the VPLMN may not have state information for the UE's configuration or subscription information, so the UE may not be trigger the change or update.

In some example embodiments, when the UE receives a configuration information update including information related to the UE's subscription (e.g., network slice identifiers such as Network Slice Selection Assistance Information, NSSAI), the UE may also receive an indication, such as a cause code for the update. If the update is due to a local change in the VPLMN, the UE may update the VPLMN related information, which the UE keeps stored at the UE.

If however the indicator, such as the cause code, represents the update is due to a change in the HPLMN configuration, such as the UE's subscription, the UE may store the received update as a change to the VPLMN configuration and as a change to the HPLMN configuration. For some (if not all) other VPLMNs configurations, the UE may record or indicate that these may be invalid due to changes in HPLMN configuration.

Moreover, when the indicator, such as the cause code, represents the update is due to a change in the HPLMN configuration, as the UE visits other VPLMNs the UE may operate as if the UE needs initial configuration information from the VPLMN (e.g., initial configuration information as if the UE visited the VPLMN for the first time). For example, the UE may delete (e.g., remove, reset, and/or the like) all UE configuration information for the VPLMN(s). For the case of network slicing VPLMN configuration, the UE for example may remove the configured NSSAI for the PLMN its mapping to the S-NSSAIs in the configured NSSAI for the HPLMN, the allowed NSSAI and its mapping to the S-NSSAIs in the configured NSSAI for the HPLMN, any rejected S-NSSAIs in the PLMN. This deletion may cause the UE to appear to the network as a UE that needs initial configuration when performing a registration procedure, and the network to provide an initial configuration to the UE, when the UE accesses as part of registration the VPLMN.

To illustrate further, when the indicator, such as the cause code, represents the update is due to a change in the HPLMN configuration, the UE may, as noted, locally delete certain configuration information, such as a network slicing configuration information (e.g., NSSAIs as noted above), for some, if not all, other VPLMNs. As such, when the UE performs a registration procedure in these other VPLMNs, the UE may not send a request for NSSAI(s), but instead may receive from the network a configuration for the VPLMN. This received configuration information may include slice identifiers, such as a S-NSSAI, for use at a VPLMN and mapping to HPLMN values.

In some example embodiments, the UE may wait in the serving VPLMN for an updated policy, such Vas an URSP (UE Route and access Selection policy) from the network before the UE performs a new registration procedure as the URSP may also change, when the UE subscription to the S-NSSAIs has changed.

Figure 1:
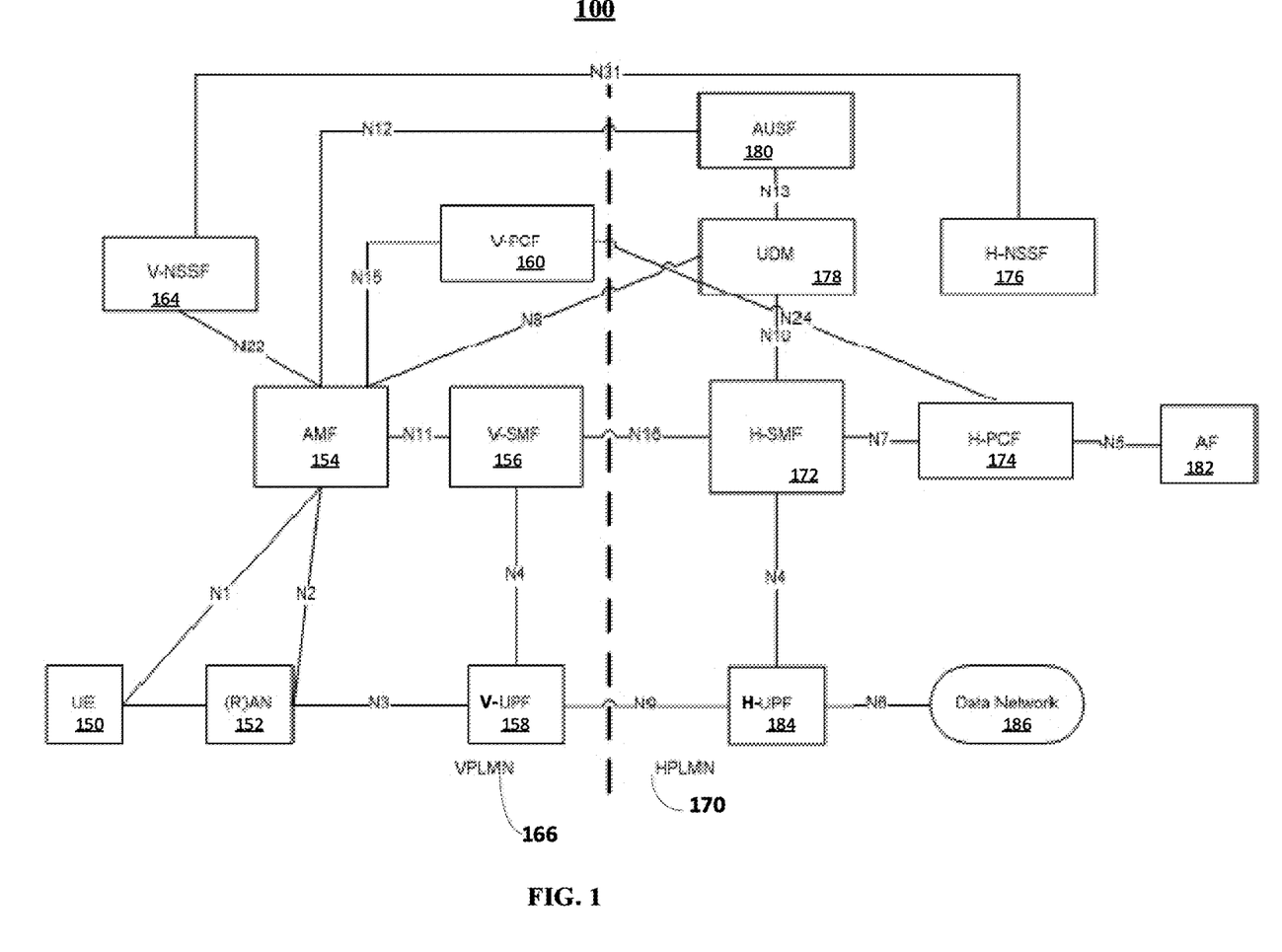
FIG. 1 depicts an example of a portion of a 5G wireless network, in accordance with some example embodiments.

FIG. 1 depicts an example of a portion of a 5G wireless network 100, in accordance with some example embodiments.

The 5G wireless network 100 may include a user equipment (UE) 150 configured to wirelessly couple to a radio access network (RAN) 152 being served by a wireless access point, such as a base station, wireless local area network access point, home base station, and/or other type of wireless access point.

The network 100 may include a core network, which may include an access and mobility management function (AMF) 154, a visiting session management function (V-SMF) 156, a visiting policy control function (v-PCF) 160, a visiting network slice selection function (v-NSSF) 164, and/or a visiting user plane function (V-UPF) 158. In the example of FIG. 1, devices 152-164 may be associated with a visiting public land mobile network (VPLMN) 166.

The network 100 and/or the core network may include devices having functions supporting a home public land mobile network (HPLMN) 170 as well. For example, these devices in the HPLMN 170 may include devices and corresponding functions for "home" wireless local area network (WLAN) access, offloading, and/or non-3GPP access. These devices may include a home SMF 172, a home PCF 174, a home NSSF 176, unified data management 178, an authentication server function (AUSF) 180, an application function (AF) 182, a home user plane function (H-UPF) 184, and a data network (DN) 186.

FIG. 1 also depicts service interfaces, such as N1, N2, N3, N4, N6, N7, N11, N15, N18, N24, and/or the like. The architecture, nodes (including AMF, V-PCF, H-PCF, H-SMF, and V-SMF as well as other devices depicted at FIG. 1), and the service interfaces may be defined in accordance with a standard, such as 3GPP TS 23.501, although other standards as well as proprietary interfaces may be used.

A network slice refers to a logical network that provides specific network capabilities and network characteristics. The network slice may be considered a logical end-to-end network that can be dynamically created, so that a given UE may access different network slices over the same radio access network (e.g., over the same radio interface). The network slices can provide different services and/or have different QoS needs/requirements. 3GPP TS 23.501, System Architecture for the 5G System, describes examples of network slices.

The UE's subscription information may dictate the configuration information related to the quantity, QoS type, and/or identity of the network slices. The UE's configuration information (provided by the network when registering in a PLMN, such as a VPLMN and/or HPLMN) may include one or more network slice identifiers, such as one or more single NSSAIs (S-NSSAI). The S-NSSAI may be comprised of: a) a slice/service type (SST), which refers to the expected network slice behavior in terms of features and services;

and/or b) a slice differentiator (SD), which is optional information that complements the Slice/Service type(s) to differentiate amongst multiple network slices of the same Slice/Service type.

Figure 2:
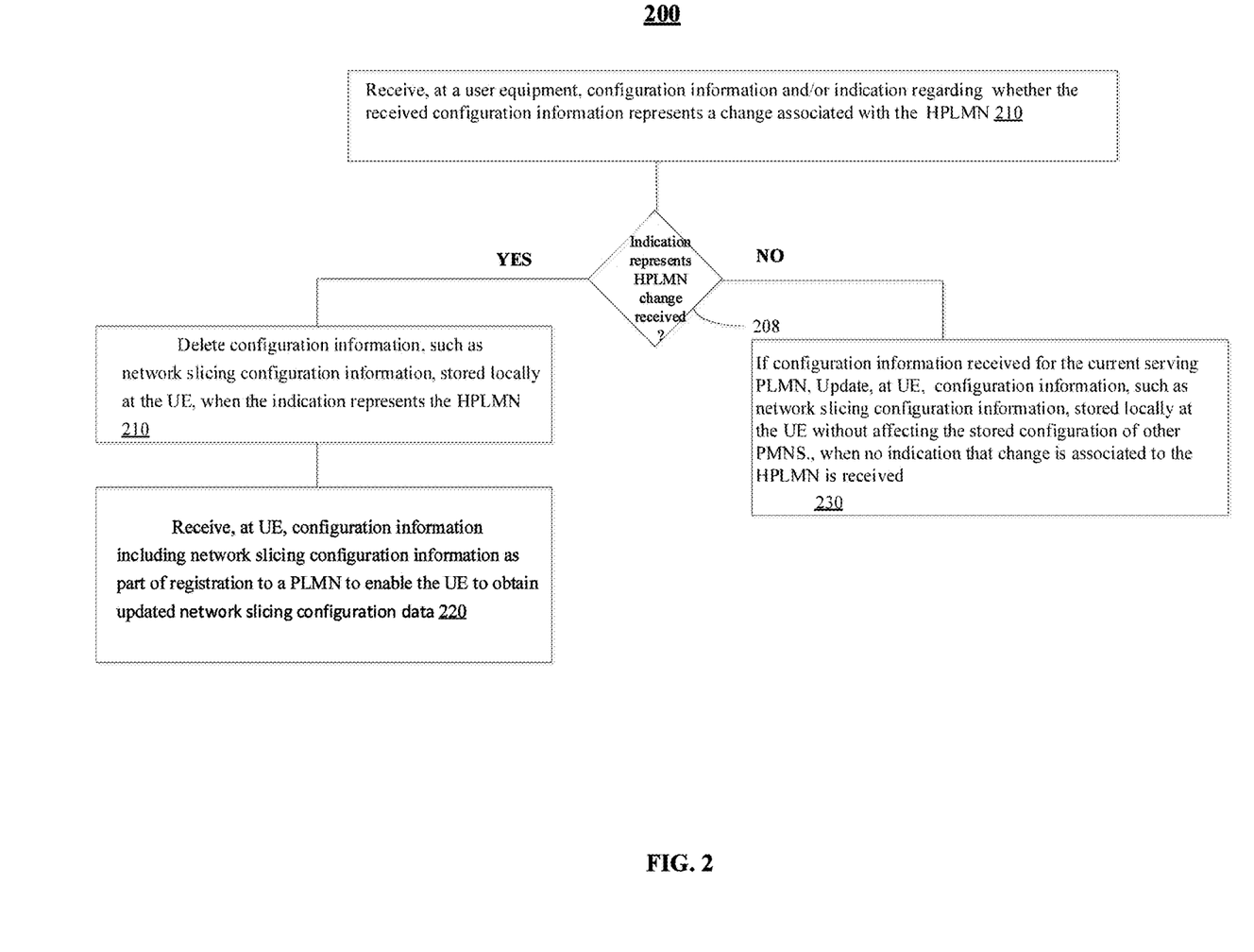
FIG. 2 depicts an example of a process flow for VPLMN configuration updating, in accordance with some example embodiments.

FIG. 2 depicts an example of a process 200, in accordance with some example embodiments. The description of FIG. 2 refers to FIG. 1 as well.

At 205, a user equipment 150 may receive, from the network, configuration information and/or an indication regarding whether the configuration information represents a change, such as an update or a modification, that is local to a VPLMN (which is currently serving the UE) or a change associated with the HPLMN, in accordance with some example embodiments. In some example embodiments, the configuration information may be received in a message, such as a registration accept or in a UE configuration update message. The indication may be included in the configuration information or signaled separately to the UE. The presence of the indication may signal that the UE's HPLMN has made a configuration change that needs to be applied to the UE's configuration at the VPLMNs. In some implementations, the indication (or its absence) may indicate that a UE's configuration information should be updated locally so as to only affect the UE's configuration with the currently serving VPLMN, rather than other VPLMNs (or the HPLMN). In some example embodiments, the indication is included in the configuration information. For example, the configuration information may represent configuration information for the currently serving VPLMN, and include the indication to signal the UE whether the change is needed to the UE's configuration information. Alternatively or additionally, the indication may be provided to the UE separate from the configuration information.

When the indication represents an HPLMN configuration change (which may, for example, be caused due to a change to the UE's subscription information), the UE may delete previous configuration information stored locally at the UE (yes at 208, 210). The deleted configuration information may include network slicing configuration information, such as the configured NSSAI for the PLMN, its mapping to the S-NSSAIs in the configured NSSAI for the HLMN, the allowed NSSAI and its mapping to the S-NSSAIs in the configured NSSAI for the HPLMN, any rejected S-NSSAIs in the PLMN and/or the like. Moreover, the deleted configuration information may be for some, if not all, other VPLMNs. For example, the UE may delete the previously stored network slicing configuration information stored for all VPLMNs. More specifically, the UE may deletes the slicing information for all other PLMNs while retaining any "current" configuration received at 205 for the currently serving VPLMN.

During registration with the network, the UE 150 may register in another VPLMN, in which case the UE may not send a request for NSSAI(s) but, at 220, instead receive, from the network, configuration information including the network slicing configuration information for the VPLMN, when the indication represents the HPLMN configuration change. This configuration information may include slice identifiers, such as an S-NSSAI, for use at a VPLMN, and their mapping to the values used in the HPLMN.

In some example embodiments, the UE may wait in the serving PLMN for an updated policy, such as an URSP (UE Route and access Selection policy) from the network before the UE performs a new registration procedure, at 220, as the URSP may also change, when the UE subscription to the S-NSSAIs has changed.

When the indication represents a local, VPLMN configuration change, the UE may update the stored configuration information including network slicing information for the serving VPLMN without affecting (e.g., deleting, updating, etc.) the configuration for the other PLMNs (no at 208, 230). In some example embodiments, the UE may determine the UE configuration change is a local one based on not receiving an indication.

Figure 3:
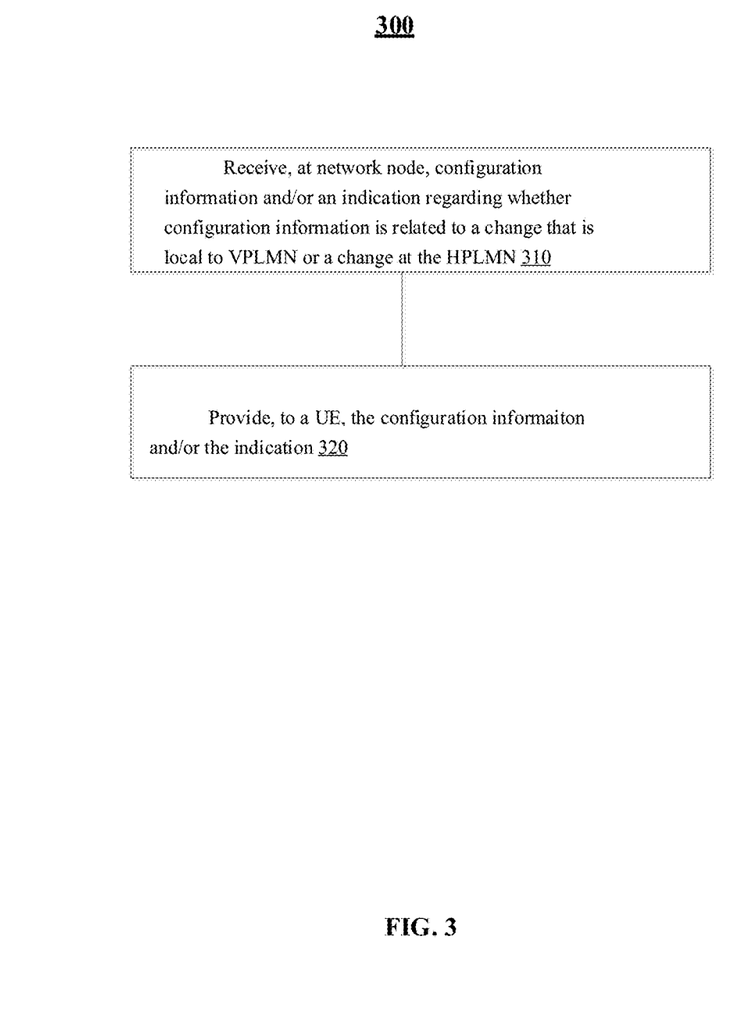
FIG. 3 depicts another example of a process flow for VPLMN configuration updating, in accordance with some example embodiments.

FIG. 3 depicts an example of a process 300, in accordance with some example embodiments. The description of FIG. 2 refers to FIG. 1 as well.

At 310, a network node, such as a base station 152, may receive from the AMF 154 configuration information and/or an indication regarding whether the configuration information represents a change, such as an update or modification, that is local to a VPLMN or a change associated with the HPLMN, in accordance with some example embodiments. At 320, the network node may provide to the UE 150 the configuration information and/or the indication regarding whether the configuration information represents the change, such as an update or a modification, that is local to a VPLMN or a change associated with the HPLMN.

In some example embodiments, when an AMF, such as AMF 154, updates the UE 150, the AMF may indicate to the UE (via the base station 152) whether the update is due to changes in the subscribed S-NSSAIs. The AMF may detect this update or change because the AMF receives updated data from the UDM 178 or because the AMF receives an indication from the UDM that the UE's network slicing subscription has changed.

If the UE is informed that network slicing subscription information has changed then the UE may, as noted, locally delete the network slicing information the UE has for all other PLMNs (i.e., so when it registers in other PLMNs it sends no requested NSSAI and the serving PLMN may updates the UE configuration for the serving PLMN). It also updates the current PLMN information with any received values. And, if the URSP is needed, it awaits for an updated URSP (UE Route and access Selection policy) before performing a new Registration procedure.

In some example embodiments, when the subscribed S-NSSAIs change and when the UE is not reachable at the time of change, a Universal Data Repository (UDR) flag may be set in the HPLMN to make sure the AMF is informed that the subscription data includes an updated set of S-NSSAIs, when the UE registers with an AMF in a PLMN when it is reachable. Since the AMF updates successfully the UE, the UE may be requested to register with an indication to the AMF to update the UDM 178 to reset this flag.

To illustrate further, the S-NSSAIs (which may be in the configured NSSAI for an HPLMN) may, at the time when they are provided to the UE, match the subscribed S-NSSAIs for the UE. When the subscribed S-NSSAI(s) are updated (e.g., by removing an old S-NSSAI and/or adding a new S-NSSAI) for the serving PLMN that the UE 150 is registered in, the AMF 154 may update (via the base station 152 labeled "(R)AN") the UE with the configured NSSAI of the serving VPLMN, allowed NSSAI, and/or an associated mapping with configured NSSAI for the HPLMN. But as noted above, only the configured NSSAI for the current serving VPLMN will be updated to match the new subscription information. As such, if the UE visits another VPLMN different from the HPLMN and it has a configured NSSAI stored for this VPLMN, this information will be out of date. The UE may store the configured NSSAI for several VPLMNs in addition to the current, serving VPLMN, so that the UE may not need to be configured with the configured NSSAI when returning to these VPLMNs.

The configured NSSAI for the serving PLMN includes the S-NSSAI values, which can be used in the serving PLMN and may be associated with mapping of each S-NSSAI of the configured NSSAI to one or more corresponding S-NSSAI values in the configured NSSAI for the HPLMN. When providing a requested NSSAI to the network upon registration, the UE in a given PLMN may include and use S-NSSAIs applying to this PLMN (which may include be associated with mapping of each S-NSSAI of the requested NSSAI to the S-NSSAIs of the configured NSSAI for the HPLMN that is a part of the configured and/or allowed NSSAIs applicable for this PLMN). Upon successful completion of a UE's registration procedure over a radio access type, the UE may obtain an allowed NSSAI for this access type, which includes one or more S-NSSAIs from the AMF (which may include associated with mapping of allowed NSSAI to configured NSSAI for the HPLMN). These S-NSSAIs are valid for the current registration area and access type provided by the AMF the UE has registered with and may be used by the UE (up to a given number of simultaneous network slices or PDU Sessions).

When the UE is provisioned with a configured NSSAI for a PLMN and/or the associated mapping of this configured NSSAI to the configured NSSAI for the HPLMN, the configured NSSAI (and/or if present the associated mapping) may both be stored in the UE until a new configured NSSAI for this PLMN (and/or the associated mapping) are provisioned in the UE.

When provisioned with a new configured NSSAI for a PLMN (and/or the new associated mapping of this configured NSSAI to the configured NSSAI for the HPLMN), the UE may, as noted, replace any stored (old) configured NSSAI for this PLMN with the new configured NSSAI for this PLMN; and the UE may delete any stored associated mapping of this old configured NSSAI for this PLMN to the configured NSSAI for the HPLMN and, if present, store the associated mapping of this new configured NSSAI to the configured NSSAI for the HPLMN; and the UE may delete any stored allowed NSSAI and associated mapping as well as rejected S-NSSAI for this PLMN.

The UE may keep storing the received configured NSSAI for a PLMN and associated mapping to the configured NSSAI for the HPLMN even when registering in another PLMN. However, the number of configured NSSAI and associated mapping to be kept stored in the UE for PLMNs other than the HPLMN may be up to UE implementation.

If the VPLMN performs the configuration update of a UE registered in the VPLMN (e.g. due to a change in the Subscribed S-NSSAI(s)), this may result in updates to the configured NSSAI for the serving PLMN and/or to the associated mapping of the configured NSSAI for the serving PLMN to the configured NSSAI for the HPLMN. Updates to the allowed NSSAI and/or to the associated mapping of the allowed NSSAI to the configured NSSAI for the HPLMN may be implemented if the configuration update affects S-NSSAI(s) in the current allowed NSSAI.

The UE may replace only the configured NSSAI for the current PLMN when the configured NSSAI changes. This is the correct behavior when the change is due to a VPLMN decision for the VPLMN. However, when the change is due to subscription changes, the STORED configured NSSAIs and mappings to the S-NSSAI values in the configured NSSAI for the HPLMN for Other PLMNs also becomes invalid and stale. However, the AMF in other PLMNs may not be receiving the updated configuration (nor are the other PLMNs aware of this change), so these PLMNs will not trigger a configured NSSAI change due to subscription change. This means the UE will not be properly configured when returning to these PLMNs.

When no requested NSSAI was included or when an S-NSSAI was rejected in the PLMN, the AMF may update the UE slice configuration information for the PLMN.

The UE may include no requested NSSAI in a VPLMN registration request when it has no configuration for the VPLMN. The VPLMN, if applicable, may then configure the UE with the configured NSSAI for the PLMN. When a PLMN updates the configured NSSAI for a UE, the PLMN may, as noted, explicitly indicate to the UE whether the change is dues to a local configuration change, or whether it is due to change in HPLMN configuration. If the change is due to HPLMN configuration change then (1) the UE may locally delete the network slicing configuration information it has for all other PLMNs and may wait for an updated URSP before performing a new Registration procedure, as the URSP also changes when the US subscription to S-NSSAIs has changed. And if the change is due only to a local, serving PLMN reason, the UE may updates the information for the serving PLMN with no consequences for the configuration for other PLMNs.

As noted, the UE may be configured by the HPLMN with network slice configuration information. For example, the HPLMN may push to the UDM the configuration information, which may be provided to the UE via the AMF and base station. The network slice configuration information may include one or more configured NSSAI(s). A configured NSSAI may apply either to one PLMN or to all PLMNs that do not have a specific configured NSSAI (e.g. this could be possible for NSSAIs containing only S-NSSAIs with standard values, see, e.g., 3GPP TS 23.501, clause 5.15.2.1). There is at most one configured NSSAI per PLMN. The configured NSSAI of a PLMN may include S-NSSAIs that have standard values or PLMN-specific values. The configured NSSAI for the serving PLMN may include the S-NSSAI values which can be used in the serving PLMN and may be associated with mapping of each S-NSSAI of the configured NSSAI to one or more corresponding S-NSSAI values in the configured NSSAI for the HPLMN.

The S-NSSAIs in the configured NSSAI for the HPLMN, at the time when they are provided to the UE, may, as noted, match the subscribed S-NSSAIs for the UE. When the subscribed S-NSSAI(s) are updated (e.g., removing an old and/or adding a new) and it is applicable to the Serving PLMN the UE may be registered in, the AMF may update the UE with the configured NSSAI of the serving PLMN and/or allowed NSSAI and/or the associated mapping with configured NSSAI for the HPLMN.

When providing a requested NSSAI to the network upon registration, the UE in a given PLMN may only include and use the S-NSSAIs applicable to this PLMN (and possibly associated with mapping of each S-NSSAI of the requested NSSAI to the S-NSSAIs of the configured NSSAI for the HPLMN that is part of the configured and/or allowed NSSAIs applicable for this PLMN). Upon successful completion of a UE's registration procedure over an access type, the UE may obtain an allowed NSSAI for this access type, which includes one or more S-NSSAIs, from the AMF, possibly associated with mapping of allowed NSSAI to configured NSSAI for the HPLMN. These S-NSSAIs may be valid for the current registration area and access type provided by the AMF the UE has registered with, and may be used simultaneously by the UE (up to the maximum number of simultaneous network slices or PDU sessions).

The UE might also obtain one or more rejected S-NSSAIs with cause and validity of rejection from the AMF. An S-NSSAI may be rejected for the entire PLMN or for the current registration area.

While the UE remains RM-REGISTERED in the PLMN and regardless of the access type, the UE may not re-attempt to register to an S-NSSAI rejected for the entire PLMN until this rejected S-NSSAI is deleted. While the UE remains RM-REGISTERED in the PLMN, the UE may not re-attempt to register to an S-NSSAI rejected in the current Registration Area until it moves out of the current Registration Area.

The UE may store the (S-)NSSAIs as follows. When the UE is provisioned with a configured NSSAI for a PLMN and/or the associated mapping of this configured NSSAI to the configured NSSAI for the HPLMN, the configured NSSAI (and/or if present, the associated mapping) may be stored in the UE until a new configured NSSAI for this PLMN and/or the associated mapping are provisioned in the UE (or when the HPLMN configuration changes. When provisioned with a new configured NSSAI for a PLMN and/or the new associated mapping of this configured NSSAI to the configured NSSAI for the HPLMN, or when requested to remove the configuration for PLMN due to HPLMN configuration change, the UE may replace any stored (e.g., old) configured NSSAI for this PLMN with the new configured NSSAI for this PLMN (if applicable); and the UE may delete any stored associated mapping of this old configured NSSAI for this PLMN to the configured NSSAI for the HPLMN and, if present and applicable, store the associated mapping of this new configured NSSAI to the configured NSSAI for the HPLMN; and the UE may delete any stored allowed NSSAI and associated mapping as well as rejected S-NSSAI for this PLMN;

If received, the allowed NSSAI for a PLMN and access type (and any associated mapping of this allowed NSSAI to the configured NSSAI for the HPLMN) may be stored in the UE. The UE may store this allowed NSSAI and any associated mapping of the allowed NSSAI to the configured NSSAI for the HPLMN (which may also be persisted when the UE is turned off).

The UE may persistently store the allowed NSSAI and any associated mapping of the allowed NSSAI to the configured NSSAI for the HPLMN.

If received, an S-NSSAI rejected for the entire PLMN may be stored in the UE while RM-REGISTERED in this PLMN regardless of the access type or until it is deleted.

If received, an S-NSSAI rejected for the current Registration Area may be stored in the UE while RM-REGISTERED until the UE moves out of the current Registration Area or until it is deleted.

One or more S-NSSAIs in an allowed NSSAI provided to the UE may have values, which are not part of the UE's slice configuration information for the serving PLMN. In this case, the allowed NSSAI is associated with mapping information regarding how each S-NSSAI of the allowed NSSAI corresponds to the S-NSSAI(s) of the configured NSSAI for the HPLMN. This mapping information may be sufficient to allow the UE to associate for a given application the S-NSSAI as per network slice selection policy (NSSP) of the URSP rules (see, e.g., rules defined in TS 23.503) with the corresponding S-NSSAI from the allowed NSSAI.

At any time, the AMF may provide the UE with a new configured NSSAI for the serving PLMN associated with mapping of the configured NSSAI to the configured NSSAI for the HPLMN. The configured NSSAI for the serving PLMN and the mapping information may be determined in the AMF (if based on configuration, the AMF is allowed to determine the Network Slice configuration for the whole PLMN) or determined by the NSSF. The AMF may provide the new configured NSSAI as part of a UE configuration update procedure.

If the HPLMN performs the configuration update of a UE registered in the HPLMN (e.g. due to a change in the subscribed S-NSSAI(s)), this may result in updates to the configured NSSAI for the HPLMN. Updates to the allowed NSSAI and/or, if present, to the associated mapping of the allowed NSSAI to the configured NSSAI for the HPLMN may also possible if the configuration update affects S-NSSAI(s) in the current allowed NSSAI.

If the VPLMN performs the configuration update of a UE registered in the VPLMN (e.g. due to a change in the Subscribed S-NSSAI(s)), this may result in updates to the configured NSSAI for the serving PLMN and/or to the associated mapping of the configured NSSAI for the serving PLMN to the configured NSSAI for the HPLMN. Updates to the allowed NSSAI and/or to the associated mapping of the allowed NSSAI to the configured NSSAI for the HPLMN may also be implemented if the configuration update affects S-NSSAI(s) in the current allowed NSSAI.

A UE for which the configured NSSAI for the serving PLMN has been updated and has deleted the stored allowed NSSAI may, as noted, initiate a registration procedure to receive a new valid allowed NSSAI.

Figure 4:
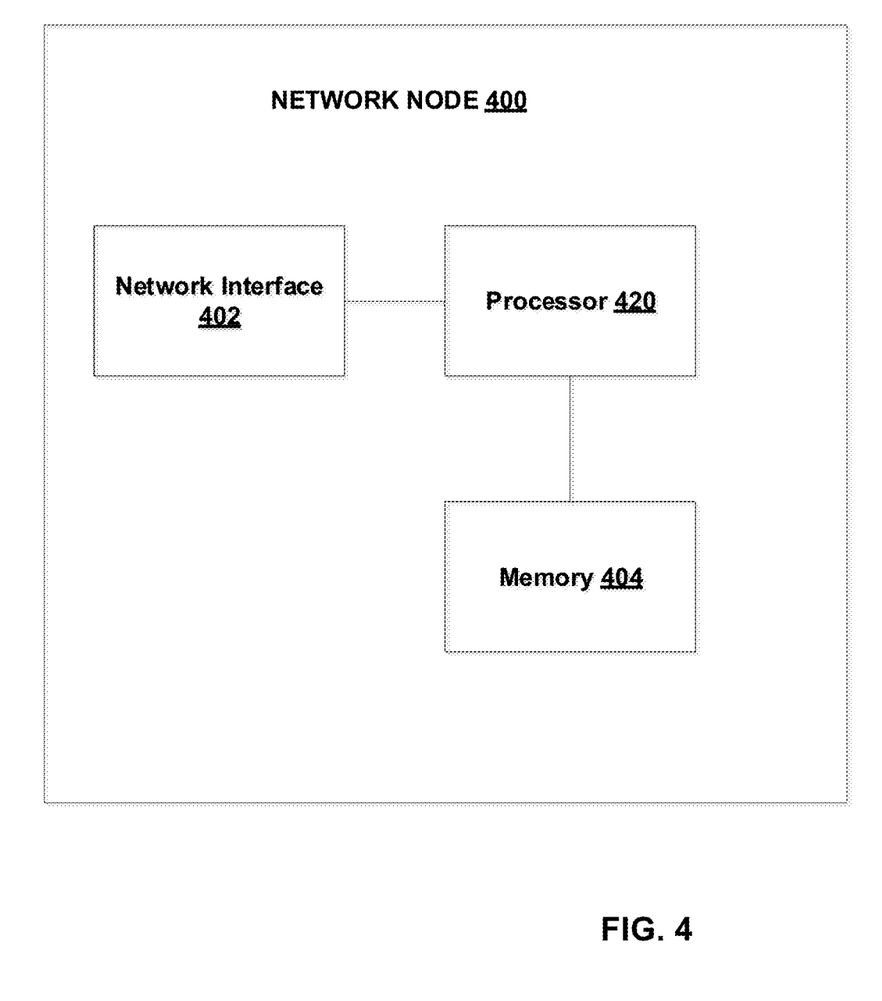
FIG. 4 depicts an example of a network node, in accordance with some example embodiments.

FIG. 4 depicts a block diagram of a network node 400, in accordance with some example embodiments. The network node 400 may be configured to provide one or more network side operations as described with respect to FIG. 3, for example. Moreover, a mobile wireless network may have a plurality of the network nodes 400 as well. For example, the network node may be incorporated into one or more of the devices 152-180.

The network node 400 may include a network interface 402, a processor 420, and a memory 404, in accordance with some example embodiments. The network interface 402 may include wired and/or wireless transceivers to enable access other nodes including base stations, devices 152-180, the Internet, and/or other nodes. The memory 404 may comprise volatile and/or non-volatile memory including program code, which when executed by at least one processor 420 provides, among other things, the processes disclosed herein including process 200, 300, 400, and/or the like.

Figure 5:
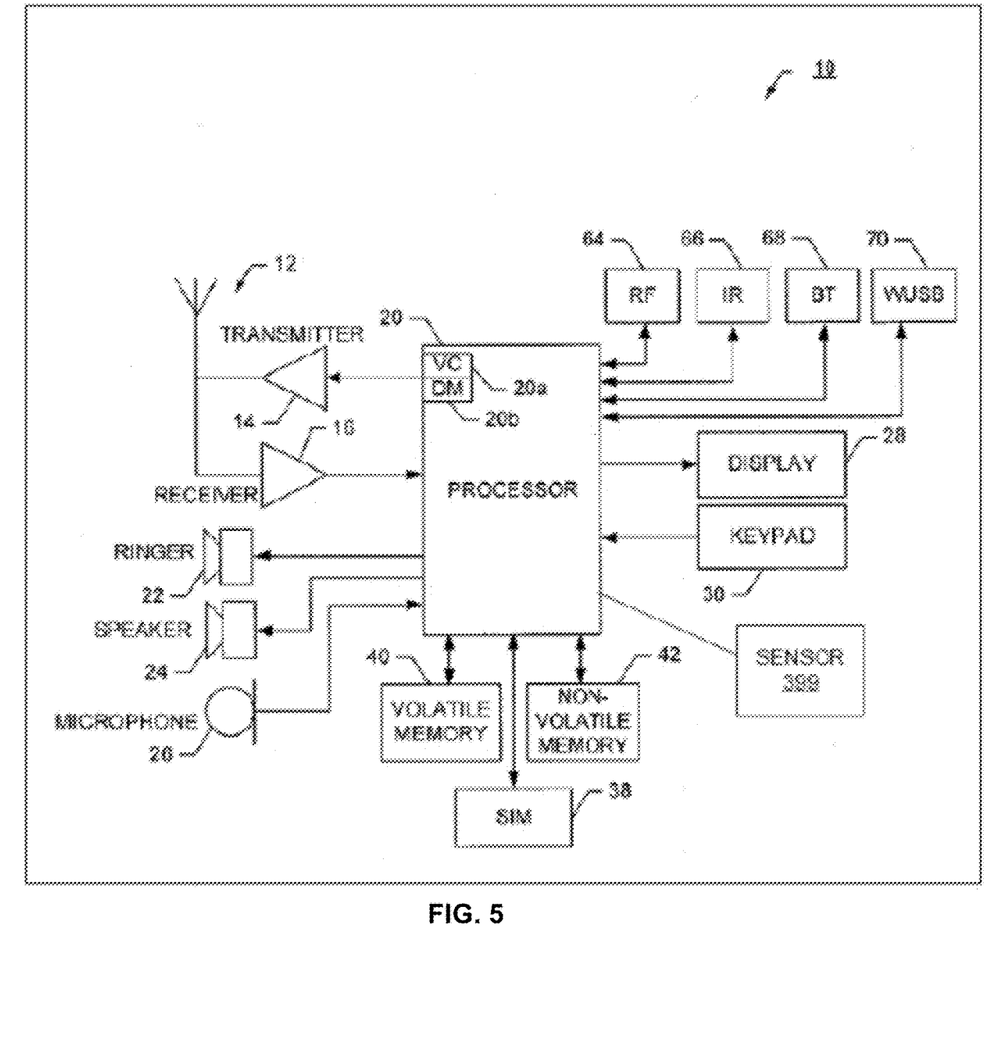
FIG. 5 depicts an example of an apparatus, in accordance with some example embodiments.

FIG. 5 illustrates a block diagram of an apparatus 10, in accordance with some example embodiments.

The apparatus 10 may represent a user equipment, such as the user equipment 150. The apparatus 10, or portions therein, may be implemented in other network nodes including base stations/WLAN access points as well as the other network nodes (e.g., devices 152-184).

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the base stations/WLAN access points and network nodes including the UEs (see, e.g., process 200 and/or 300).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be improved UE configuration.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor; and
   at least one memory including computer program code,
   the at least one memory and the computer program code configured to, with the at least one processor, cause the apparatus to at least:
   receive an indication regarding whether a home network of said apparatus makes a change to first network slice configuration information stored at said home network and associated with the apparatus; and
   delete, in an instance in which the received indication represents the change, second network slice configuration information stored at said apparatus, said second network slice configuration information comprising information regarding one or more network slice configurations associated with a visited network currently serving said apparatus and information regarding one or more network slice configurations associated with one or more other visited networks.

2. The apparatus of claim 1, wherein the first network slice configuration information is different from the second network slice configuration information.

3. The apparatus of claim 1, wherein the apparatus is further caused to at least:
receive updated network slice configuration information including or together with the indication.

4. The apparatus of claim 1, wherein the deletion of the second network slice configuration information includes deletion of network slice configuration information associated with the home network of the apparatus.

5. The apparatus of claim 4, wherein the deletion enables the apparatus to obtain updated network slice configuration information for at least the visited network currently serving the apparatus, the one or more other visited networks, and the home network of the apparatus.

6. The apparatus of claim 1, wherein at least one of the first network slice configuration information or the second network slice configuration information includes at least one network slice identifier.

7. The apparatus of claim 1, wherein the apparatus is further caused to at least:
receive updated network slice configuration information for the visited network currently serving the apparatus to replace the deleted second network slice configuration information, in an instance in which the indication represents the change associated with the home network is received.

8. The apparatus of claim 7, wherein the apparatus is further configured to at least:
wait to perform, after receiving the updated network slice configuration information, a registration to obtain the updated network slice configuration information until an updated user equipment route and access selection policy are received.

9. The apparatus of claim 7, wherein the apparatus is further caused to at least:
update network slice configuration information for the visited network..

10. The apparatus of claim 1, wherein the indication represents the home network indicating to the visited network currently serving the apparatus that the change in the home network is to be taken into account in the visited network currently serving the apparatus for configuring the apparatus.

11. The apparatus of claim 1, wherein the apparatus is further caused to at least:
receive configuration information including the indication.

12. A method comprising:
receiving, at a user equipment, an indication regarding whether a home network of said user equipment makes a change to first network slice configuration information stored at said home network and associated with the user equipment; and
deleting, in an instance in which the received indication represents the change, second network slice configuration information stored at said user equipment, said second network slice configuration information comprising information regarding one or more network slice configurations associated with a visited network currently serving said user equipment and information regarding one or more network slice configurations associated with one or more other visited networks.

13. The method of claim 12, wherein the first network slice configuration information is different from the second network slice configuration information.

14. The method of claim 12, further comprising:
receiving updated network slice configuration information including or together with the indication.

15. The method of claims 12, wherein the deleting of the second network slice configuration information includes deleting of network slice configuration information associated with the home network of the user equipment.

16. The method of claim 12, wherein at least one of the first network slice configuration information or the second network slice configuration information includes at least one network slice identifier.

17. The method of claim 12, wherein the deleting enables obtaining updated network slice configuration information for at least the visited network currently serving the user equipment, and the one or more other visited networks.

18. The method of claim 12, further comprising:
receiving updated network slice configuration information for the visited network currently serving the user equipment to replace the deleted second network slice configuration information, when the indication represents the change associated with the home network is received.

19. The method of claim 18, further comprising:
waiting to perform, after receiving the updated network slice configuration information, a registration to obtain the updated network slice configuration information until an updated user equipment route and access selection policy are received.

20. The method of claim 18, further comprising:
updating said second network slice configuration information for the visited network currently serving the user equipment.

21. The method of claim 12, wherein the indication represents the home network indicating to the visited network currently serving the user equipment that the change in the home network is to be taken into account in the visited network currently serving the user equipment for configuring the user equipment.

22. The method of claim 12, further comprising:
receiving configuration information including the indication.

23. A non-transitory computer readable medium including program code which, when executed, causes operations comprising:
receiving, at a user equipment, an indication regarding whether a home network of said user equipment makes a change to first network slice configuration information stored at said home network and associated with the user equipment; and
deleting, in an instance in which the received indication represents the change, second network slice configuration information stored at said user equipment, said second network slice configuration information comprising information regarding one or more network slice configurations associated with a visited network currently serving said user equipment and information regarding one or more network slice configurations associated with one or more other visited networks.

24. An apparatus comprising:
at least one processor; and
at least one memory including computer program code, the at least one memory and the computer program code configured to, with the at least one processor, cause the apparatus to at least:

receive an indication regarding whether a home network of said apparatus makes a change to first network slice configuration information stored at said home network and associated with the apparatus; and delete, in an instance in which the received indication represents the change, second network slice configuration information stored at said apparatus, said second network slice configuration information comprising information regarding one or more network slice configurations and associated with a visited network currently serving said apparatus and information regarding one or more network slice configurations associated with at least one other visited network or the home network.

25. A method comprising:

receiving, at a user equipment, an indication regarding whether a home network of said user equipment makes a change to first network slice configuration information stored at said home network and associated with the user equipment; and deleting, in an instance in which the received indication represents the change, second network slice configuration information stored at said user equipment, said second network slice configuration information comprising information regarding one or more network slice configurations associated with a visited network currently serving said user equipment and information regarding one or more network slice configurations associated with at least one other visited network or the home network.

26. A non-transitory computer readable medium including program code which, when executed, causes operations comprising:

receiving, at a user equipment, an indication regarding whether a home network of said user equipment makes a change to first network slice configuration information stored at said home network and associated with the user equipment; and deleting, in an instance in which the received indication represents the change, second network slice configuration information stored at said user equipment, said second network slice configuration information comprising information regarding one or more network slice configurations associated with a visited network currently serving said user equipment and information regarding one or more network slice configurations associated with at least one other visited network or the home network.

27. An apparatus comprising:

at least one processor; and at least one memory including computer program code, the at least one memory and the computer program code configured to, with the at least one processor, cause the apparatus to at least:

receive an indication regarding whether a home network of said apparatus makes a change to first network slice configuration information stored at said home network and associated with the apparatus; and delete, in an instance in which the received indication represents the change, second network slice configuration information stored at said apparatus, said second network slice configuration information comprising information regarding one or more network slice configurations and associated with a visited network currently serving said apparatus and any other information regarding one or more network slice configurations associated with any other visited networks.

28. A method comprising:

receiving, at a user equipment, an indication regarding whether a home network of said user equipment makes a change to first network slice configuration information stored at said home network and associated with the user equipment; and deleting, in an instance in which the received indication represents the change, second network slice configuration information stored at said user equipment, said second network slice configuration information comprising information regarding one or more network slice configurations associated with a visited network currently serving said user equipment and any other information regarding one or more network slice configurations associated with any other visited networks.

29. A non-transitory computer readable medium including program code which, when executed, causes operations comprising:

receiving, at a user equipment, an indication regarding whether a home network of said user equipment makes a change to first network slice configuration information stored at said home network and associated with the user equipment; and deleting, in an instance in which the received indication represents the change, second network slice configuration information stored at said user equipment, said second network slice configuration information comprising information regarding one or more network slice configurations associated with a visited network currently serving said user equipment and any other information regarding one or more network slice configurations associated with any other visited networks.

30. An apparatus comprising:

at least one processor; and at least one memory including computer program code, the at least one memory and the computer program code configured to, with the at least one processor, cause the apparatus to at least:

receive an indication regarding whether a home network of said apparatus makes a change to first network slice configuration information stored at said home network and associated with the apparatus; and in an instance in which the received indication represents the change to the first network slice configuration information stored at said home network and associated with the apparatus:

delete second network slice configuration information stored at said apparatus, said second network slice configuration information comprising information regarding one or more network slice configurations associated with a visited network currently serving said apparatus, and in an instance in which the apparatus stores information regarding one or more network slice configurations associated with one or more other visited networks, delete said information regarding one or more network slice configurations associated with the one or more other visited networks.

31. A method comprising:

receiving, at a user equipment, an indication regarding whether a home network of said user equipment makes a change to first network slice configuration information stored at said home network and associated with the user equipment; and in an instance in which the received indication represents the change to the first network slice configuration information stored at said home network and associated with the user equipment:

deleting second network slice configuration information stored at the user equipment, said second network slice configuration information comprising information regarding one or more network slice configurations associated with a visited network currently serving the user equipment; and in an instance in which the user equipment stores information regarding one or more network slice configurations associated with one or more other visited networks, deleting said information regarding one or more network slice configurations associated with the one or more other visited networks.

32. A non-transitory computer readable medium including program code which, when executed, causes operations comprising:

receiving, at a user equipment, an indication regarding whether a home network of said user equipment makes a change to first network slice configuration information stored at said home network and associated with the user equipment; and in an instance in which the received indication represents the change to the first network slice configuration information stored at said home network and associated with the user equipment:

deleting second network slice configuration information stored at the user equipment, said second network slice configuration information comprising information regarding one or more network slice configurations associated with a visited network currently serving the user equipment; and in an instance in which the user equipment stores information regarding one or more network slice configurations associated with one or more other visited networks, deleting said information regarding one or more network slice configurations associated with the one or more other visited networks.

33. An apparatus comprising:
at least one processor; and
at least one memory including computer program code, the at least one memory and the computer program code configured to, with the at least one processor, cause the apparatus to at least:

receive an indication regarding whether a home network of said apparatus makes a change to network slice configuration information stored at said home network and associated with the apparatus; and delete, in an instance in which the received indication represents the change to said network slice configuration information stored at said home network and associated with said apparatus, all network slice configuration information stored at said apparatus and associated with any visited networks or the home network.

34. A method comprising:
receiving, at a user equipment, an indication regarding whether a home network of said user equipment makes a change to network slice configuration information stored at said home network and associated with the user equipment; and deleting, in an instance in which the received indication represents the change to said network slice configuration information stored at said home network and associated with said user equipment, all network slice configuration information stored at said user equipment and associated with any visited networks or the home network.

35. A non-transitory computer readable medium including program code which, when executed, causes operations comprising:

receiving, at a user equipment, an indication regarding whether a home network of said user equipment makes a change to network slice configuration information stored at said home network and associated with the user equipment; and deleting, in an instance in which the received indication represents the change to said network slice configuration information stored at said home network and associated with said user equipment, all network slice configuration information stored at said user equipment and associated with any visited networks or the home network.

36. An apparatus comprising:
at least one processor; and
at least one memory including computer program code, the at least one memory and the computer program code configured to, with the at least one processor, cause the apparatus to at least:

receive an indication regarding whether a home network of said apparatus makes a change to network slice configuration information stored at said home network and associated with the apparatus; and delete, in an instance in which the received indication represents the change to said network slice configuration information stored at said home network and associated with the apparatus, all network-specific network slice configuration information stored at the apparatus, said network-specific network slice configuration information being specifically applicable with two or more of: the home network, the visited network currently serving the apparatus, or any other visited networks.

37. A method comprising:
receiving, at a user equipment, an indication regarding whether a home network of said user equipment makes a change to network slice configuration information stored at said home network and associated with the user equipment; and deleting, in an instance in which the received indication represents the change to said network slice configuration information stored at said home network and associated with the user equipment, all network-specific network slice configuration information stored at the user equipment, said network-specific network slice configuration information being specifically applicable with two or more of: the home network, the visited network currently serving the user equipment, or any other visited networks.

38. A non-transitory computer readable medium including program code which, when executed, causes operations comprising:

receiving, at a user equipment, an indication regarding whether a home network of said user equipment makes a change to network slice configuration information stored at said home network and associated with the user equipment; and deleting, in an instance in which the received indication represents the change to said network slice configuration information stored at said home network and associated with the user equipment, all network-specific network slice configuration information stored at the user equipment, said network-specific network slice configuration information being specifically applicable with two or more of: the home network, the visited network currently serving the user equipment, or any other visited networks.

* * * * *